United States Patent [19]

Mojden et al.

[11] Patent Number: 4,655,350

[45] Date of Patent: Apr. 7, 1987

[54] REVERSED END EJECTOR SYSTEM

[75] Inventors: Wallace W. Mojden; Andrew E. Mojden, both of Hinsdale, Ill.

[73] Assignee: Fleetwood Systems, Inc., Countryside, Ill.

[21] Appl. No.: 749,314

[22] Filed: Jun. 26, 1987

[51] Int. Cl.$^4$ ............................................. B07C 5/00
[52] U.S. Cl. ................................... 209/577; 198/398; 209/539; 209/652; 209/928; 221/9
[58] Field of Search ............... 209/539, 576, 577, 586, 209/587, 588, 598, 651–653, 928, 936; 198/398; 221/9, 134, 157, 163; 53/53, 54, 542

[56] References Cited

U.S. PATENT DOCUMENTS

| | | | |
|---|---|---|---|
| 1,722,751 | 7/1929 | Jones | 209/577 |
| 2,410,037 | 10/1946 | Abbott | 198/398 |
| 2,821,302 | 1/1958 | Fowler et al. | 209/587 |
| 2,937,749 | 5/1960 | Strzala | 209/652 |
| 3,097,744 | 7/1963 | Hutter et al. | 209/577 |
| 3,350,842 | 11/1967 | Renish | 53/53 |
| 3,730,325 | 5/1973 | Goodwin | 209/652 |
| 3,859,522 | 1/1975 | Cuthbert | 209/587 |
| 4,307,556 | 12/1981 | Furuya | 53/54 |
| 4,386,708 | 6/1983 | Sieverin | 209/644 |

FOREIGN PATENT DOCUMENTS 2098565 11/1982 United Kingdom ............... 209/653

*Primary Examiner*—Robert B. Reeves
*Assistant Examiner*—Donald T. Hajec
*Attorney, Agent, or Firm*—Trexler, Bushnell, Giangiorgi & Blackstone, Ltd.

[57] ABSTRACT

A reversed can end ejector system is provided for detecting and ejecting a can end in reverse orientation with respect to a moving stack of otherwise similarly aligned and nested can ends. This system comprises an optical detection apparatus including a light-emitting portion for emitting light in a direction toward the path of travel and a light-detecting portion located adjacent said path of travel. The optical detection apparatus is responsive to one of the presence or absence of light incidence upon its light-detecting portion for producing a control signal. An ejector is movable relative to the stack for contacting and ejecting a reversed can end therefrom and an actuator is coupled with the ejector and responsive to the control signal for driving the ejector in a direction for contacting and ejecting the reversed can end from the stack.

20 Claims, 5 Drawing Figures

REVERSED END EJECTOR SYSTEM

BACKGROUND OF THE INVENTION

This invention is directed generally to a system for detecting and ejecting a disoriented or dissimilar object from a series of moving, otherwise similar or oriented objects. More particularly, the invention is directed to the problem of removing a reversely oriented member from a linearly arranged group or stack of otherwise identical and like-oriented members.

The detection and removal of dissimilar or irregular objects from moving lines, stacks or groups of otherwise similar or regularly formed objects is often encountered in automated production and handling lines. While the present invention may find utility in a broad variety of applications, the description will be facilitated by particular reference to the problem of detecting and ejecting a reversely oriented can end from a moving stack of otherwise like-oriented, nested can ends.

Automated production facilities generally handle but two basic parts in the assembly of cans or similar cylindrical containers. These parts comprise a cylindrical or tubular body which may have either one or both ends thereof open, and a closure member for the open end or ends. In this regard, the body may be formed by a process such as rolling and seaming of a generally flat strip of material to form a generally cylindrical, tubular body having both ends open. Alternatively, extruding or similar forming procedures may be utilized for forming a one-piece, seamless can or container body having but a single, generally circular, open end. In either case, a generally circular end closure member must be provided for each open end of each container to be fabricated or assembled. Normally the last such end assembled with the container is assembled therewith following the filling process.

It is common practice in automated assembly facilities to utilized preformed and prestacked can ends. In this regard, the can end utilized comprises a generally flat, circular member which has been preformed by suitable means to define peripherally projecting flange portions suitably shaped for mating with the outermost edge portions of the cylindrical container bodies. These flange portions, together with the central, body portion (which may be flat or crowned and also may have a "flip-top" type of opening assembly preformed and/or preassembled therewith) may be stacked together in a nested configuration.

In accordance with conventional practice, these nested stacks of can ends are usually provided in prepackaged form. That is, a given number, usually a multiple of 6, such as 300 or 360 can ends are prestacked in nested configuration and disposed in a paper bag or some other stripable or otherwise readily removable packaging material. Preferably, the entire package is introduced into a generally tubular conveyor or conduit member and thereupon the paper or other packaging material is automatically or manually removed in an axially rearward direction and the can ends are then fed to a processing machine wherein they are assembled to the can bodies. Automatic feeding of the ends is also used at the apparatus wherein a linear material is applied to the inner rim of the end.

It will be appreciated that such stripping and removal of the paper packaging material in an axial direction tends to impart a degree of frictional force to the can ends in the stack. This force is ordinarily of little consequence to the can ends interiorly of the stack. However, with respect to those can ends at or near the end of the stack such frictional force may result in dislodgement or "flipping" of one or more of these can ends such that one or more of these dislodged can ends now lies in reverse orientation with respect to the remaining ends in the stack and is no longer nested.

In this latter regard, the configuration of the above-mentioned rims and generally crowned (if any) surfaces of the can ends is not a symmetrical configuration viewed from both sides thereof. Hence, an end placed in reverse orientation is no longer properly oriented and can not be accommodated by the processing equipment, and may lead to a malfunction of said equipment. Accordingly, it is desirable to detect such reversed can ends and eject them from the moving stack or line of can ends in the supply conduit prior to the point of introduction into the processing equipment for assemblying the ends with the container bodies.

Heretofore, such improperly or reversely oriented ends have generally been manually rejected, often together with the container body to which the automated machinery has attempted to assemble the improperly oriented end. This results in production delays, as well as considerable scrap both of which are costly.

OBJECTS AND SUMMARY OF THE INVENTION

Accordingly, it is a general object of the invention to provide a novel and improved system for detecting a dissimilar or disoriented object in a series of otherwise similar or oriented objects moving along a given path of travel and for ejecting the detected dissimilar object from the series.

A more particular object is to provide a system which will automatically detect and eject a reversely oriented can end from a moving stack of otherwise like-oriented, nested can ends.

A related object is to provide a system in accordance with the foregoing objects which may readily be inserted into an existing conveyor or conduit system with but minimum modification thereto.

A related object is to provide a system in accordance with the foregoing objects which is relatively simple and inexpensive in its design and manufacture and yet highly reliable in operation.

Briefly and in accordance with the foregoing objects, the invention provides a system for detecting a dissimilar object in a series of otherwise similar objects moving along a given path of travel and for ejecting the detected dissimilar object from the series. The system comprises optical detection means including light-emitting means positioned for directing light generally toward the path of travel and light-detecting means located adjacent said path of travel and responsive to one of the presence or absence of light incident thereupon for producing a control signal; ejector means movable relative to said path of travel for contacting and ejecting individual objects therefrom; and actuator means operatively coupled with said ejector means and responsive to said control signal for driving said ejector means in a direction for contacting and ejecting said dissimilar object from the path of travel.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

DETAILED DESCRIPTION OF THE ILLUSTRATED EMBODIMENT

Figure 1:
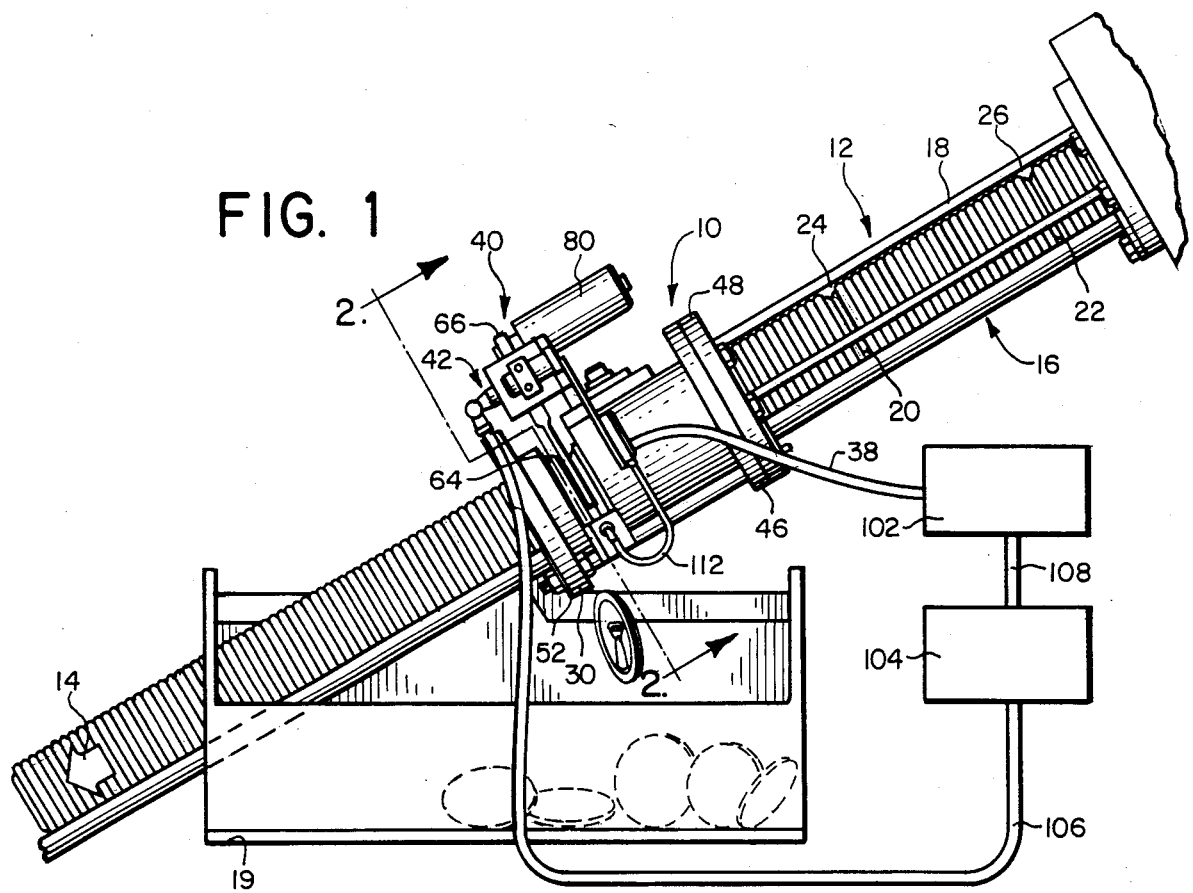
FIG. 1 is a side elevation of a reversed end ejector system in accordance with the invention.

Referring to the drawings and initial FIG. 1, a system for detecting and ejecting dissimilar or disoriented objects from a series of otherwise similar or oriented objects moving along a given path of travel is indicated generally by reference numeral 10.

In the illustrated embodiment, the similar objects comprise a nested stack of can ends indicated generally by reference numeral 12. These can ends are moved in a direction indicated generally by arrow 14 along a path of travel defined by a conduit or conveyor system 16. In the illustrated embodiment, the system 10 is conveniently interposed in the path of travel defined by the conduit or conveyor system 16 so as to detect and eject reversely oriented can ends from the otherwise like-oriented and nested stack of can ends 12.

The conveyor system 16 also runs through a basket-like collector or container member 19 for receiving can ends as they are ejected from the conveyor as generally indicated in FIG. 1.

Generally speaking, the stack 12 of like-oriented and nested can ends defines a substantially solid, generally cylindrical exterior surface as indicated generally by reference numeral 18. However, it will be noted that when one can end, such as ends 20 and 22 in FIG. 1 are reversely oriented with respect to the stack 12, they abut oppositely facing surfaces of the adjacent can ends in the stack, resulting in peripheral gaps along the otherwise solid cylindrical surface 18 as indicated generally at reference numerals 24 and 26. As briefly discussed hereinabove, it is important to detect and eject these reversely oriented can ends such as ends 20 and 22 from the conveyor system 16 prior to reaching the end of the conveyor and the point of assembly with can or other container bodies. Accordingly, the detection and ejection system 10 is advantageously interposed at a convenient location along the path of travel continuous with the conveyor system 16 itself. As will be seen presently, the addition of the detecting and ejecting system 10 to this conveyor system 16 requires but minimal modification thereto.

Figure 2:
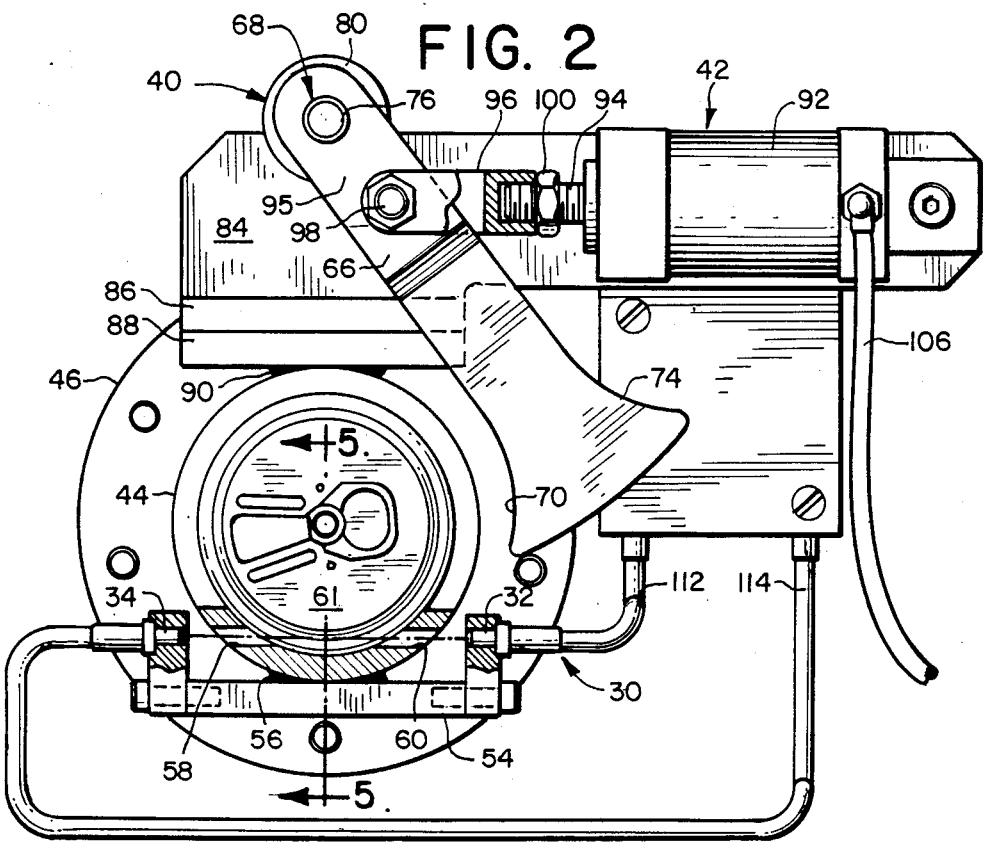
FIG. 2 is an enlarged developmental view taken generally along the line 2—2 of FIG. 1.
Figure 3:
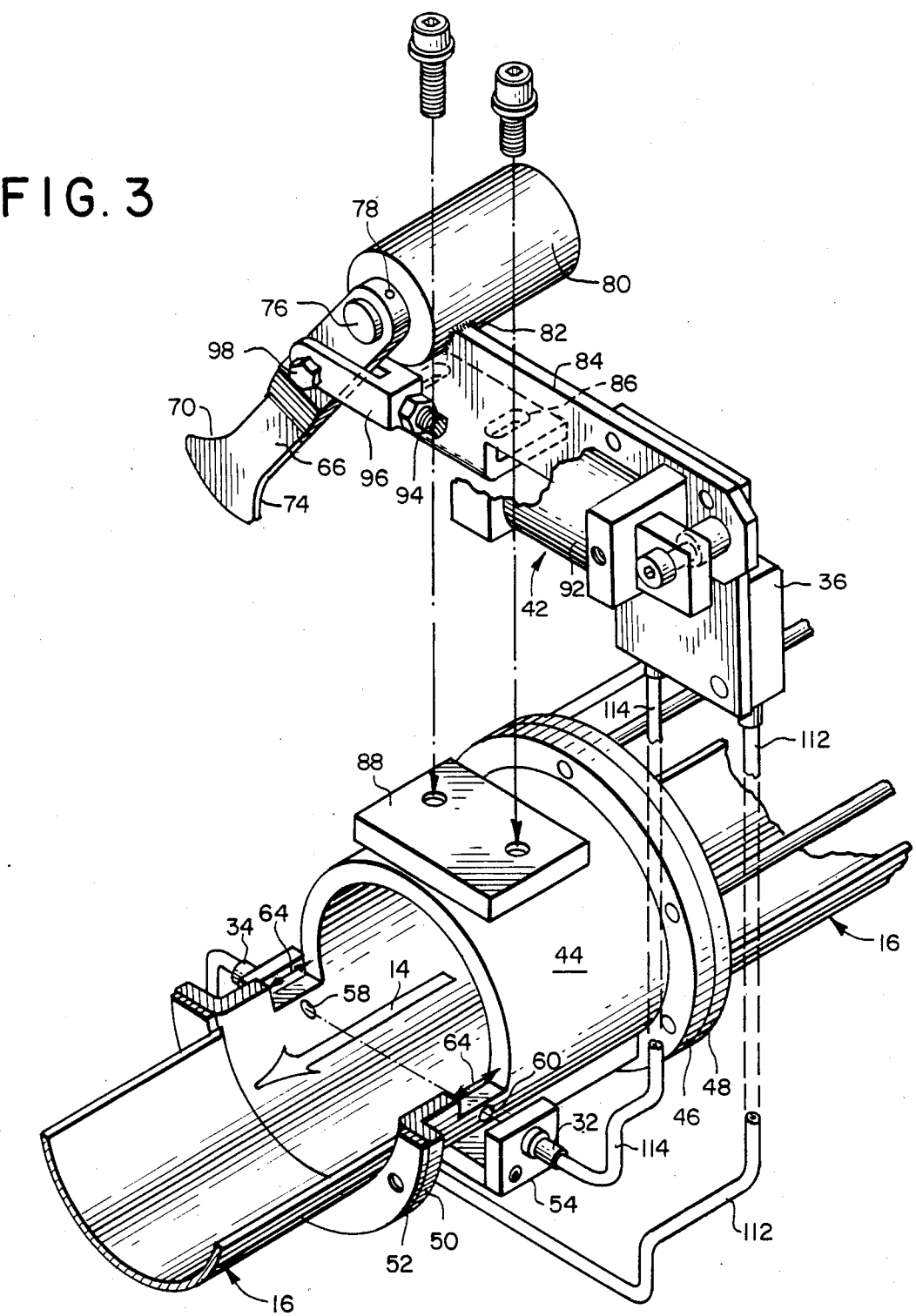
FIG. 3 is a partially exploded perspective view, partially broken away and partially in section, showing details of the assembly of a major portion of the ejector system of the invention.

Referring now also to FIG. 2, the system 10 will be seen to include optical detection means designated generally by the reference numeral 30. The optical detection means includes light-emitting means 32 positioned for emitting light in a direction toward the path of travel and light-detecting means 34 located in a predetermined alignment relative to the path of travel, as will be more fully explained presently. The optical detection means is responsive to one of the presence or absence of light incident upon the light-detecting means 34 for producing a control signal. In the illustrated embodiment, the optical detection means also includes a control circuit portion 36 operatively coupled with both the light-emitting means 32 and light-detecting means 34 which develops this control signal and delivers it to an output line 38.

The system 10 also includes an ejector or ejector means designated generally by reference numeral 40 which is movable in a predetermined direction relative to the path of travel defined by the conveyor system 16 for ejecting an object, such as a reversely oriented can end 20 or 22 from the path of travel.

Cooperatively, actuator means designated generally by reference numeral 42 are operatively coupled with this ejector means 40 and responsive to the control signal developed by the optical detection means for driving the detector means in the direction for ejecting the dissimilar object or reversely oriented can end from the path of travel defined by conveyor system 16.

Referring now more particularly to the remaining drawings, details of the foregoing portions of the invention will be described. Initially, the detecting and ejecting system 10 will be seen to include a generally tubular, and preferably cylindrical, open-ended conduit 44 which is interposed in and forms part of the path of travel defined by the conveyor system 16. Advantageously, this conduit 44 may be readily interposed in line with the conveyor 16 by providing suitable mating flanges 46, 48 and 50, 52 on the conduit 44 and conveyor 16 respectively. Hence, the conduit is positioned for receiving the objects or can ends therethrough. Moreover, the light-emitting means 32 and light-detecting means 34 will be seen to be mounted to the conduit 44, preferably by a mounting bracket 54 which may be affixed to the conduit by welding as indicated generally at 56.

The conduit 44 includes a through, transverse bore defined by a pair of aligned and opposite bore portions 58, 60 which are in alignment with a preselected portion of the objects or can ends passing through the conduit. In the illustrated embodiment, the through bore 58, 60 is positioned at a lower portion of the conduit 44 so as to align with a radially outer or peripheral edge portion of the cans in the stack 12. Hence, this bore 58, 60 is in 0 alignment with the peripheral or radially outer gaps 24, 26 formed as described above by reversely oriented can ends 20, 22. The light-emitting means 32 and light-detecting means 34 are mounted in alignment with opposite ends of the through bore 58, 60 and in mutually facing relation.

Figure 4:
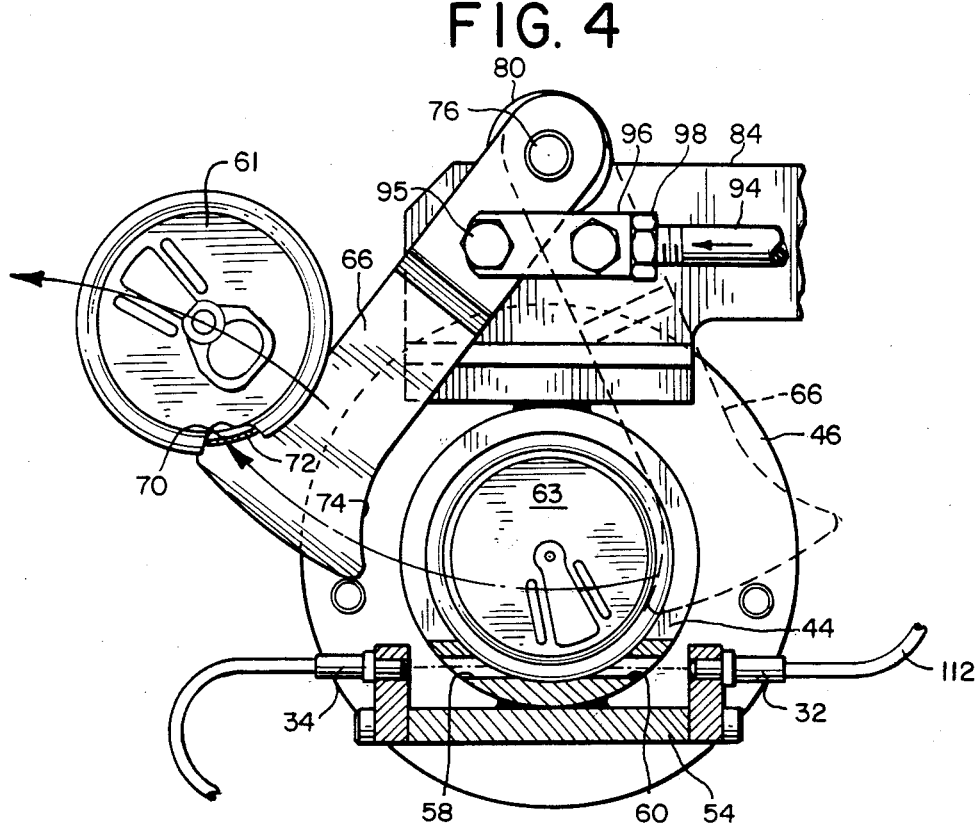
FIG. 4 is an elevation, similar to FIG. 2, illustrating a moved position of portions of the ejector system.
Figure 5:
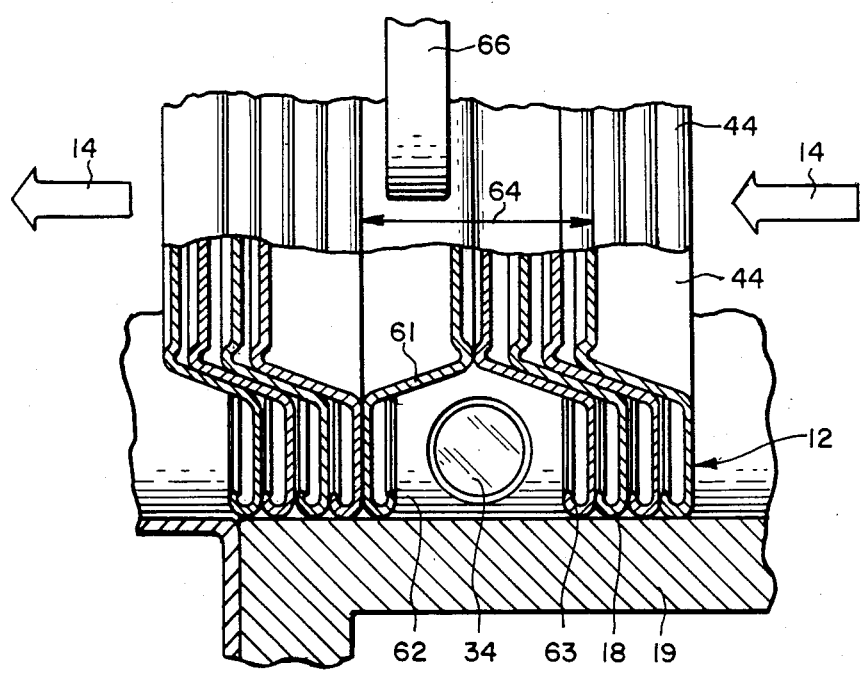
FIG. 5 is an enlarged partial sectional view taken generally along the line 4—4 of FIG. 2.

In the illustrated embodiment, the detecting means 34 is therefore positioned to receive light emitted from the emitting means 32, by way of the through bore 58, 60, when a gap, such as gaps 24 and 26, caused by a reversely oriented can end, comes into alignment with the through bore 58, 60 as the reversely oriented can end travels through the conduit 44. One such reversely oriented can end is indicated in FIGS. 2, 4 and 5 by reference numeral 61. The resultant gap 62 caused by this reversely oriented can end 61 and its alignment with both the through bores 58, 60 and both of light-emitting and light-detecting means 32 and 34 are best viewed in FIG. 5, this gap being indicated by reference numeral 62.

Hence, in the illustrated embodiment, the optical detection means is responsive to the presence of light on the light-detecting means 34 for emitting the control signal for causing actuation of the ejector 40. However, other optical arrangements may be utilized without departing from the invention. In particular, other applications might require that some gap be maintained or present between objects in a line passing along a conveyor, in which case the optical detection system would be responsive to the absence of light, rather than the presence of light, upon the detector 34 for emitting the same control signal. Alternatively, reflective-type optical systems might also be utilized, wherein both the light-emitting means 32 and light-detecting means 34 are mounted generally to one side of the path of travel, the light-detecting means being positioned for response to the presence or absence of light reflected from objects moving along the path of travel. In the illustrated embodiment, such a reflective system would therefore ordinarily detect the presence of light reflected off the relatively solid cylindrical surface 18 defined by the relatively shiny, metallic can during normal operation. However, a gap such as the gap 62 caused by a reversely oriented can end would interrupt the light reflected to the detecting means 34. Hence, the optical system would be responsive to this momentary absence of light at the detecting means 34 for producing the control signal for causing ejection of the reversely oriented end.

In order to permit ejection of a can end therefrom, the conduit 44 is provided with a transversal through aperture or opening or cutout portion indicated generally by reference numeral 64. This through opening or cutout portion is positioned for allowing the ejector means 40 to travel therethrough for contacting and ejecting a reversely oriented can end such as end 61 through this same cutout portion or through opening 64.

Cooperatively, the ejector means includes an elongate pivotally mounted ejector arm member 66. Mounting means 68 are provided externally or conduit 44 for mounting this ejector arm 66 for pivotal movement relative to the conduit means and specifically for permitting pivotal movement or swinging of the arm 66 for bidirectionally transversely traversing through the aperture or cutout portion 64. In this regard, reference is invited to FIG. 4, wherein movement of the ejector arm 66 to the opposite side of the conduit from that illustrated in FIG. 2 is indicated. FIG. 4 further illustrates in phantom line, initial contact with, and in solid line the ejection of, reversely oriented can end 61 from the conduit. It will be noted that ejector arm 66 stops upon reaching this latter position, thereby leaving the properly oriented following can end 63 unaffected to continue through the conduit 44 and the remainder of the conveyor system 16.

The ejector arm member 66 includes an abutment surface 70 of complementary shape to the surface portion 72 of the can end 61 contacted thereby during ejection, as best viewed in FIG. 4. In this regard, it will be seen that as the contoured or complementary surfaces 70 and 74 of ejector 66 contact a reversely oriented can end such as end 61, the end is simultaneously lifted upwardly and outwardly, to in effect "scoop" the end 61 out of the remaining bottom trough-like portion of the conduit 44 and through the cutout portion 64. In the illustrated embodiment, the ejector arm includes a substantially similar and oppositely facing surface 74 as well. Hence, the pivotal mounting means 68 locates the ejector means for contact between these surfaces 70 and 74 and complementary surfaces such as surface 72 of the can ends to be ejected from either direction.

In the illustrated embodiment, the pivotal mounting means includes a generally cylindrical shaft 76 coupled with one end of the ejector arm 66, for example by a set screw 78. This shaft 76 is rotatably mounted in a suitable bearing assembly 80 which is in turn mounted by welding or other suitable means as indicated at 82 to an elongate mounting plate 84. This mounting plate 84 is in turn mounted to the conduit 44 by means of a mounting bracket 86 which engages a complementary mounting bracket 88 affixed to the conduit, preferably by welding as indicated at 90.

The actuator means or portion 42 will be seen to comprise a piston-and-cylinder assembly designated generally by reference numeral 92. An outer end of a piston rod 94 of this piston-and-cylinder assembly 92 is coupled with the elongate ejector arm 66 at a portion 95 thereof which is intermediate the pivotal mounting 68 and its surface 70 which traverses the conduit cutout portion 64. In the illustrated embodiment, the piston rod 94 is provided with an external thread which is threadably engaged in a mating internal thread in a yoke member 96. This yoke member 96 surroundingly engages opposite side surfaces of elongate ejector arm 66 and is pivotally coupled therewith by a through pivot pin or bolt member 98. An additional jam nut 100 is also provided for securely coupling rod end 94 with the yoke 96.

The piston-and-cylinder assembly 92 is mounted in a generally horizontal orientation relative to mounting plate 84. The piston-and-cylinder is located relative to the conduit 44 and arm 66, and defines a throw of rod 94, so as to pivotally move the elongate arm 66 completely through the cutout portion 64 of conduit 44. As previously mentioned, the opposite extremes of this bidirectional movement are illustrated respectively in FIG. 2 and FIG. 4.

In the illustrated embodiment, the actuator means 42 also includes control means schematically illustrated as control elements 102 and 104 which are responsive to each control signal developed by the optical detecting means for controlling operation of the piston-and-cylinder 92. In particular, these control means alternately fully extend and fully retract the piston-and-cylinder 92, and more specifically the piston rod 94 thereof, in response to each control signal. This operation will be seen to result in pivotal movement of the ejector means or arm 66 in alternate directions, completely through the conduit cutout portion 64 so as to bidirectionally eject the dissimilar objects or reversely oriented can ends through the cutout portion 64.

In other words, when a first reversely oriented can end 61 is detected by the optical detection system 30, the control means 102 and 104 will cause the piston-and-cylinder assembly 92 to fully extend the piston rod 94 so as to move the arm 66 through the position shown in phantom line in Fig. 4 for intially contacting the reversely oriented can end 61 and thereafter to the position indicated in solid line in FIG. 4 for ejecting the can end 61 from the conduit 44. Thereupon, the ejector arm 66 will remain in the position illustrated in FIG. 4 until a further reversely oriented can end is detected. Thereupon, the responsive control signal produced by the optical detection means 30 will cause the piston rod 94 to be fully retracted so as to return the ejector arm 66 to the position shown in FIG. 2, travelling through the cutout 64 to eject the detected reversely oriented can end in the process.

In the illustrated embodiment, the piston-and-cylinder assembly or means 92 comprises a "one-way, spring-return air cylinder". That is, the cylinder is pneumatically operated in response to pressurized air delivered to one end thereof by a tube 106 for fully extending the piston rod 94. When air pressure is removed from the cylinder, for example by opening tube 106 to ambient air to release the pressure therefrom, the rod 94 is fully retracted by a spring-return mechanism provided internally of the piston-and-cylinder assembly 92.

Accordingly, the control means comprising members 102 and 104 is arranged for controlling the air flow of pressurized air to the tube 106 and the alternative venting of this tube to the atmosphere. In this regard, the control portion 102 comprises an electrical circuit control portion responsive to the control signals received from the optical detecting means control circuit portion 36 on the line 38 for producing a corresponding control output on a cable 108 to be fed to second control unit 104. The second control unit 104 is an electrically operated pneumatic control system, for example, an arrangement of solenoids for opening and closing valves between the tube or line 106 and a source of pressurized air and the atmosphere, respectively. The control member 102, 104 are therefore arranged for alternatively opening a first valve (not shown) to introduce pressurized air to tube or line 106 and opening a second valve (not shown) to vent tube 106 to the atmosphere in response to each successive control signal received on line 38 from the optical detection means 30. This in turn results in the alternate extension and retraction of piston rod 94 for ejecting reversely oriented can ends alternately bidirectionally from the conduit 44.

Preferably, the optical detector means comprises a fiber optics/light-emitting diode (LED) scanner system including the light-emitting means 32 and light-detecting means 34. Interconnecting fiber optic conductors 112 and 114 are coupled to the control unit or circuit portions 36 and define the emitting and detecting means at their respective outer ends. In the illustrated embodiment, the optical detector means circuit portion 36 comprises a commercially available fiber optic scanner of the type generally designated SM512LBFO, available from the Banner Engineering Corporation, 9714 10th Avenue North, Minneapolis, Minnesota 55441. Similarly, the fiber optic members 112 and 114, which terminate in the light-emitting means 32 and light-detecting means 34 are also available from the same source, under Part No. IF23S.

Preferably, and as best viewed in FIG. 5, the elongate ejector arm 66 is mounted and aligned for traversing the cutout portion 64 of the conduit 44 at a point slightly behind the location of the through bore 58, 60 in the direction of travel of the objects or can ends along the conduit 44. That is, the location of the elongate ejector arm 66 is suitable for properly ejecting the reversely oriented can end 61 when the gap 62 caused thereby is detected by the optical system, as this gap 62 comes into alignment with the light-emitting means 32 and light-detecting means 34.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A system detecting and ejecting a dissimilar object in a series of otherwise similar objects moving in a substantially continuous fashion along a given path of travel, including a reversely oriented can end in a moving stack of otherwise similarly aligned and nested can ends, said system comprising: optical detection means including light-emitting means positioned for emitting light in a direction generally toward said path of travel and light-detecting means located in a predetermined alignment relative to said path of travel, said optical detection means being responsive to a change in the level of light incident upon said light-detecting means due to the passage of said dissimilar object between the light-emitting means and light-detecting means for producing a control signal; ejector means movable in a predetermined direction relative to said path of travel for ejecting an object from said path of travel; and actuator means operatively coupled with said ejector means and responsive to said control signal for driving said ejector means in said predetermined direction for ejecting said dissimilar object from said path of travel, without interrupting the movement of said objects along said path.

2. A system according to claim 1 and further including tubular open-ended conduit means forming a part of said path of travel for receiving said objects therethrough, said light-emitting means and light-detecting means being mounted to said conduit means.

3. A system according to claim 2 and further including mounting means for mounting said ejector means in a predetermined alignment with said conduit means, and wherein said conduit means includes a cutout portion for receiving said ejector means therethrough for engagement with said dissimilar objects for ejection thereof from said conduit means through said cutout portion.

4. A system according to claim 2 wherein said conduit means includes a through transverse bore alignable with a preselected portion of said objects passing through the conduit means and wherein said light-emitting means and said light-detecting means are mounted in alignment with opposite ends of said through bore and in mutually facing relation.

5. A system according to claim 3 wherein said ejector means includes an abutment surface of complementary shape to a predetermined surface portion of an object to be ejected thereby, said mounting means locating said ejector means for contact between said abutment surface and said predetermined surface portion of said object as said actuator means drives said ejector means in said predetermined direction.

6. A system according to claim 2 wherein said conduit means has a cutout portion and wherein said ejector means comprises an elongate member pivotally mounted externally of said conduit, means for bidirectionally transversely moving across said conduit means through said cutout portion so as to contact and eject said dissimilar objects bidirectionally through said cutout portion.

7. A system according to claim 6 wherein said actuator means comprises piston-and-cylinder means coupled with said elongate member at a portion thereof intermediate said pivotal mounting thereof and said conduit means cutout portion.

8. A system according to claim 7 wherein said piston-and-cylinder means is located relative to said conduit means and defines a throw of sufficient length so as to pivotally move said elongate arm completely through said conduit means at said cutout portion thereof.

9. A system according to claim 7 wherein said actuator means comprises control means for alternately fully extending and fully retracting said piston-and-cylinder means in response to each control signal so as to pivotally move said ejector means in alternate directions completely through said conduit means cutout portion to bidirectionally eject said dissimilar objects therethrough.

10. A system according to claim 4 wherein said optical detector means comprises a fiber optic/LED scanner system including light-emitting and light-receiving fiber optic members comprising said light-emitting means and light-detecting means and aligned with opposite ends of said transverse bore.

11. A system according to claim 10 wherein said actuator means comprises piston-and-cylinder means coupled with said ejector means. and cylinder control means operatively coupled intermediate said optical detection means and said piston-and-cylinder means.

12. A system according to claim 3 wherein said ejector means is aligned for traversing said cutout portion of said conduit means at a location slightly behind the location of said through bore in the direction of travel of said objects along said conduit means.

13. A reversed can end ejector system for detecting and ejecting a can end in reverse orientation with respect to a moving stack of otherwise similarly aligned and nested can ends, said system comprising: optical detection means including light-emitting means for emitting light in a direction toward said path of travel and light-detecting means located adjacent said path of travel; said optical detection means being responsive to a change in the level of light incident upon said light-detecting means due to the passage of said can end in reverse orientation between the light-emitting means and light-detecting means for producing a control signal, ejector means movable relative to said stack for contacting and ejecting said reversed can end therefrom, and actuator means coupled with said ejector means and responsive to said control signal for driving said ejector means in a direction for contacting and ejecting said reversed can end from said stack, without interrupting the movement of the stack along the path.

14. A system according to claim 13 and further including tubular, open-ended conduit means forming a part of said path of travel for receiving said stack of can ends therethrough, said ilght-emitting means and light-detecting means being mounted to said conduit means.

15. A system according to claim 12 wherein said conduit means has a cutout portion and wherein said ejector means comprises an elongate member pivotally mounted externally of said conduit means for bidirectionally transversely moving across said conduit means through said cutout portion so as to contact and eject a can end in reverse orientation with respect to said nested can ends.

16. A system according to claim 15 wherein said actuator means comprises piston-and-cylinder means coupled with said elongate member at a portion thereof intermediate said pivotal mounting thereof and said conduit means cutout portion.

17. A system according to claim 16 wherein said piston-and-cylinder means is located relative to said conduit means and defines a throw of sufficient length so as to pivotally move said elongate arm completely through said conduit means at said cutout portion thereof.

18. A system according to claim 16 wherein said actuator means further comprises control means for alternately fully extending and fully retracting said piston-and-cylinder means in response to each control signal so as to pivotally move said ejector means in alternate directions through said conduit means cutout portion to bidirectionally eject said reversed can ends therethrough.

19. A system according to claim 15 wherein said conduit means includes a through transverse bore alignable with an edge portion of said stack of can ends passing through the conduit means and wherein said light-emitting means and said light-detecting means are mounted in alignment with opposite ends of said through bore and in mutually facing relation; and wherein said light-emitting means is responsive to the incidence of light thereupon from said light-emitting means for producing said control signal.

20. A system according to claim 19 wherein said ejector means is aligned for traversing said cutout portion of said conduit means at a location somewhat behind the location of said through bore in the direction of travel of said stack of can ends along said conduit means.

* * * * *

UNITED STATES PATENT AND TRADEMARK OFFICE
CERTIFICATE OF CORRECTION

PATENT NO. : 4,655,350
DATED      : April 7, 1987
INVENTOR(S) : Wallace W. Mojden and Andrew E. Mojden It is certified that error appears in the above-identified patent and that said Letters Patent is hereby corrected as shown below:

On the title page

Please change the filing date from " Jun. 26, 1987" to --Jun. 26, 1985--.

Signed and Sealed this

First Day of March, 1988

*Attest:*

DONALD J. QUIGG

*Attesting Officer*    *Commissioner of Patents and Trademarks*